(12) United States Patent
Omoya (10) Patent No.: US 10,084,931 B2
(45) Date of Patent: Sep. 25, 2018

(54) IMAGE READING DEVICE FOR READING IMAGE DATA FROM DOCUMENT SHEET, IMAGE FORMING APPARATUS, IMAGE READING METHOD

(71) Applicant: KYOCERA Document Solutions Inc., Osaka-shi, Osaka (JP)

(72) Inventor: Shinichi Omoya, Osaka (JP)

(73) Assignee: KYOCERA Document Solutions Inc., Osaka-shi, Osaka (JP)

(\*) Notice: Subject to any disclaimer, the term of this patent is extended or adjusted under 35 U.S.C. 154(b) by 0 days.

(21) Appl. No.: 15/713,350

(22) Filed: Sep. 22, 2017

(65) Prior Publication Data

US 2018/0091678 A1 Mar. 29, 2018

(30) Foreign Application Priority Data

Sep. 26, 2016 (JP) .................................. 2016-186815

(51) Int. Cl.
*H04N 1/00* (2006.01)
*H04N 1/60* (2006.01)

(52) U.S. Cl.
CPC ..... *H04N 1/00915* (2013.01); *H04N 1/00037* (2013.01); *H04N 1/00076* (2013.01); *H04N 1/00803* (2013.01); *H04N 1/00917* (2013.01); *H04N 1/0057* (2013.01); *H04N 1/00904* (2013.01); *H04N 1/6036* (2013.01); *H04N 2201/0094* (2013.01)

(58) Field of Classification Search
CPC ........... H04N 1/00915; H04N 1/00037; H04N 1/00076; H04N 1/00803; H04N 1/00917; H04N 1/0057; H04N 1/00904; H04N 1/6036; H04N 2201/0094
USPC ........................................................ 358/1.14
See application file for complete search history.

(56) References Cited

U.S. PATENT DOCUMENTS

| | | | | |
|---|---|---|---|---|
| 8,284,465 | B2* | 10/2012 | Ishikawa | H04N 1/00413 |
| | | | | 358/474 |
| 2004/0125420 | A1* | 7/2004 | Tsutsumi | H04N 1/00002 |
| | | | | 358/498 |
| 2016/0246220 | A1* | 8/2016 | Sone | G03G 15/1665 |

FOREIGN PATENT DOCUMENTS

JP   H06046194 A   2/1994

OTHER PUBLICATIONS

Toda, JP 406046194, 'Image Reader', Feb. 18, 1994, Canon Inc.*

\* cited by examiner

*Primary Examiner* — Neil R McLean
(74) *Attorney, Agent, or Firm* — Alleman Hall Creasman & Tuttle LLP (57) ABSTRACT

An image reading device includes a document sheet conveying portion, an imaging element, a reading processing portion, a detection processing portion, and a stop processing portion. The document sheet conveying portion sequentially conveys a plurality of document sheets placed on a document sheet placement portion. The imaging element is disposed at a document sheet conveyance path. The reading processing portion executes a reading process of reading image data from each of the document sheets placed on the document sheet placement portion. The detection processing portion detects an abnormal image from image data of a document sheet read in the reading process. The stop processing portion, when the detection processing portion has detected the abnormal image, stops the reading process and a power supply to the imaging element, and after an elapse of a predetermined wait time, resumes the power supply to the imaging element, and resumes the reading process.

9 Claims, 6 Drawing Sheets

FIG. 7

IMAGE READING DEVICE FOR READING IMAGE DATA FROM DOCUMENT SHEET, IMAGE FORMING APPARATUS, IMAGE READING METHOD

INCORPORATION BY REFERENCE

This application is based upon and claims the benefit of priority from the corresponding Japanese Patent Application No. 2016-186815 filed on Sep. 26, 2016, the entire contents of which are incorporated herein by reference.

BACKGROUND

The present disclosure relates to an image reading device for reading image data from a document sheet, an image forming apparatus including an image reading device, and an image reading method executed in an image reading device.

An image reading device such as a scanner may read image data from a document sheet conveyed by a document sheet conveying portion such as an ADF (Auto Document Feeder). For example, in this type of image reading device, imaging elements disposed at a conveyance path of a document sheet read image data by the CIS (Contact Image Sensor) system from the document sheet conveyed along the conveyance path. Here, for example, during removal of a document sheet jammed in the conveyance path, if a worker touches the imaging elements, the static electricity of him/her may flow into the imaging elements, and a latch-up may occur between the imaging elements. There is known, as a related technology, an image reading device which prevents such a latch-up by supplying power to the imaging elements only when reading operation of image data is performed. It is noted that when a latch-up occurs between imaging elements, an abnormal stripe image that extends along a sub scanning direction and is different from an image of the document sheet, appears on the read image data.

SUMMARY

An image reading device according to an aspect of the present disclosure includes a document sheet conveying portion, an imaging element, a power source, a reading processing portion, a detection processing portion, and a stop processing portion. The document sheet conveying portion sequentially conveys a plurality of document sheets placed on a document sheet placement portion. The imaging element is disposed at a conveyance path along which the document sheets are sequentially conveyed by the document sheet conveying portion. The power source supplies power to the imaging element. The reading processing portion executes, by using the document sheet conveying portion and the imaging element, a reading process of reading image data from each of the document sheets placed on the document sheet placement portion. The detection processing portion detects an abnormal stripe image from image data of a document sheet read in the reading process, the abnormal stripe image extending along a sub scanning direction and being different from an image of the document sheet. The stop processing portion, when the detection processing portion has detected the abnormal stripe image, stops the reading process and stops a power supply from the power source to the imaging element, and after an elapse of a predetermined wait time, resumes the power supply from the power source to the imaging element, and resumes the reading process.

An image forming apparatus according to another aspect of the present disclosure includes the image reading device and an image forming portion configured to form an image based on image data.

An image reading method according to a further aspect of the present disclosure is executed in an image reading device that includes a document sheet conveying portion configured to sequentially convey a plurality of document sheets placed on a document sheet placement portion, an imaging element disposed at a conveyance path along which the document sheets are sequentially conveyed by the document sheet conveying portion, and a power source configured to supply power to the imaging element. The image reading method includes a reading step, a detection step, and a stop step. In the reading step, a reading process of reading image data from each of the document sheets placed on the document sheet placement portion is executed by using the document sheet conveying portion and the imaging element. In the detection step, an abnormal stripe image is detected from image data of a document sheet read in the reading process, the abnormal stripe image extending along a sub scanning direction and being different from an image of the document sheet. In the stop step, when the abnormal stripe image has been detected in the detection step, the reading process is stopped and a power supply from the power source to the imaging element is stopped, and after an elapse of a predetermined wait time, the power supply from the power source to the imaging element is resumed, and the reading process is resumed.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

[Configuration of Image Forming Apparatus 10]

Figure 1:
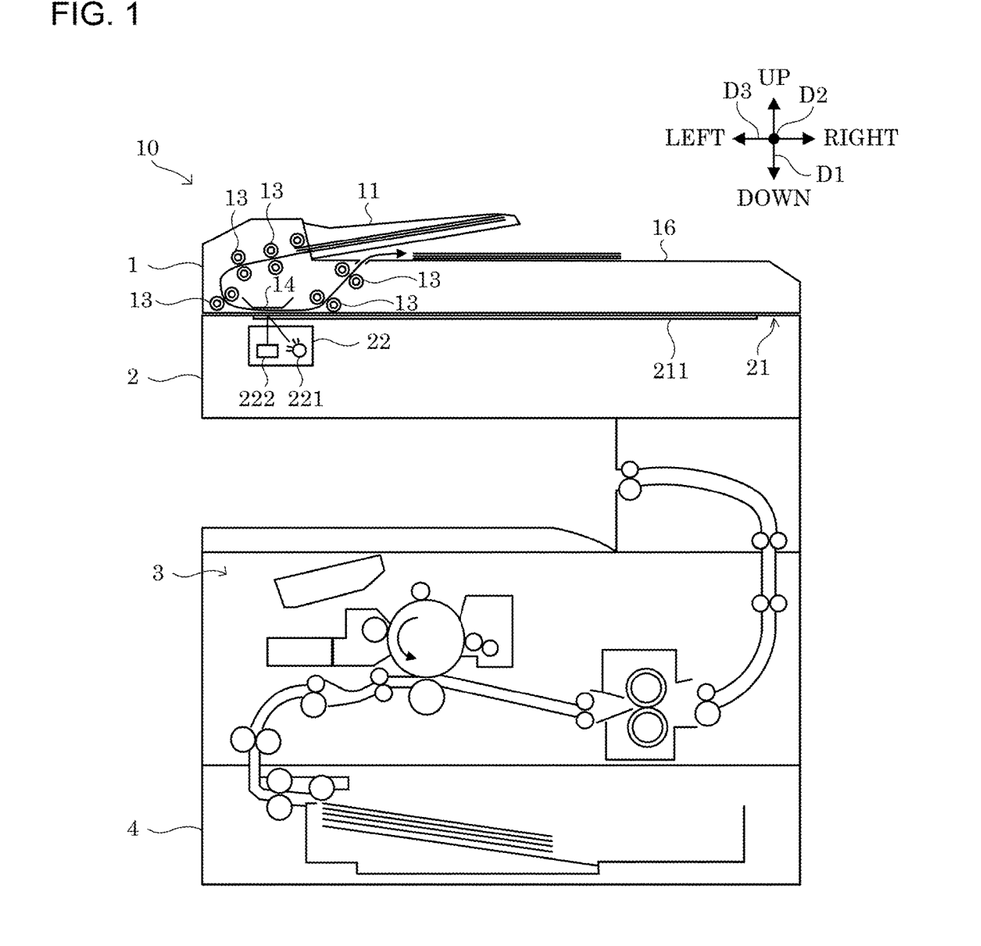
FIG. 1 is a diagram showing a configuration of an image forming apparatus according to an embodiment of the present disclosure.
Figure 3:
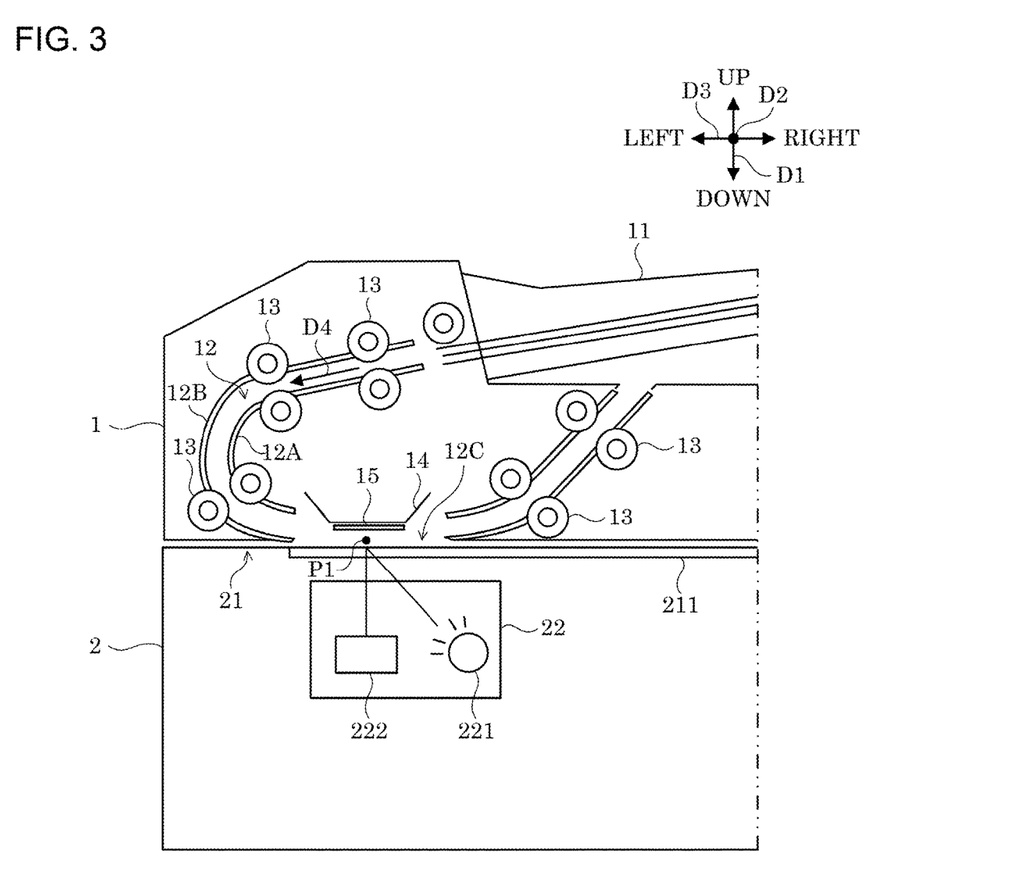
FIG. 3 is a diagram showing a configuration of an ADF and an image reading portion of the image forming apparatus according to the embodiment of the present disclosure.
Figure 4:
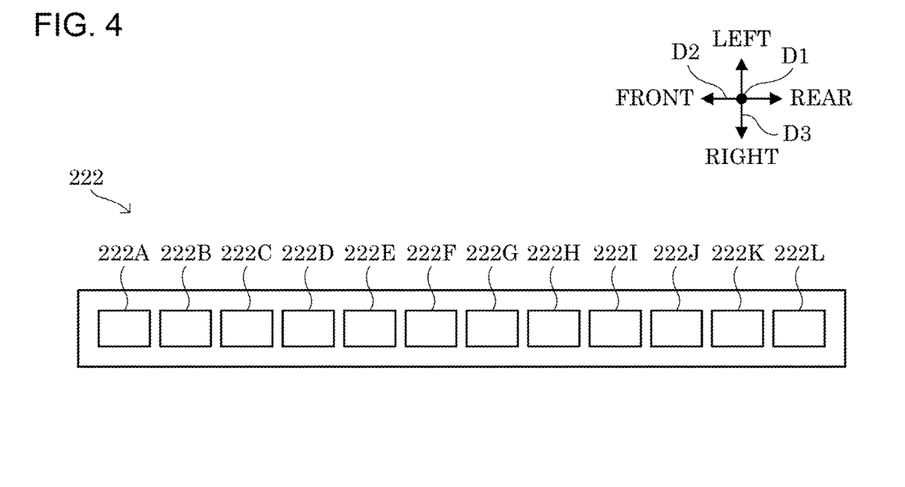
FIG. 4 is a diagram showing a configuration of an imaging element group of the image forming apparatus according to the embodiment of the present disclosure.
Figure 5:
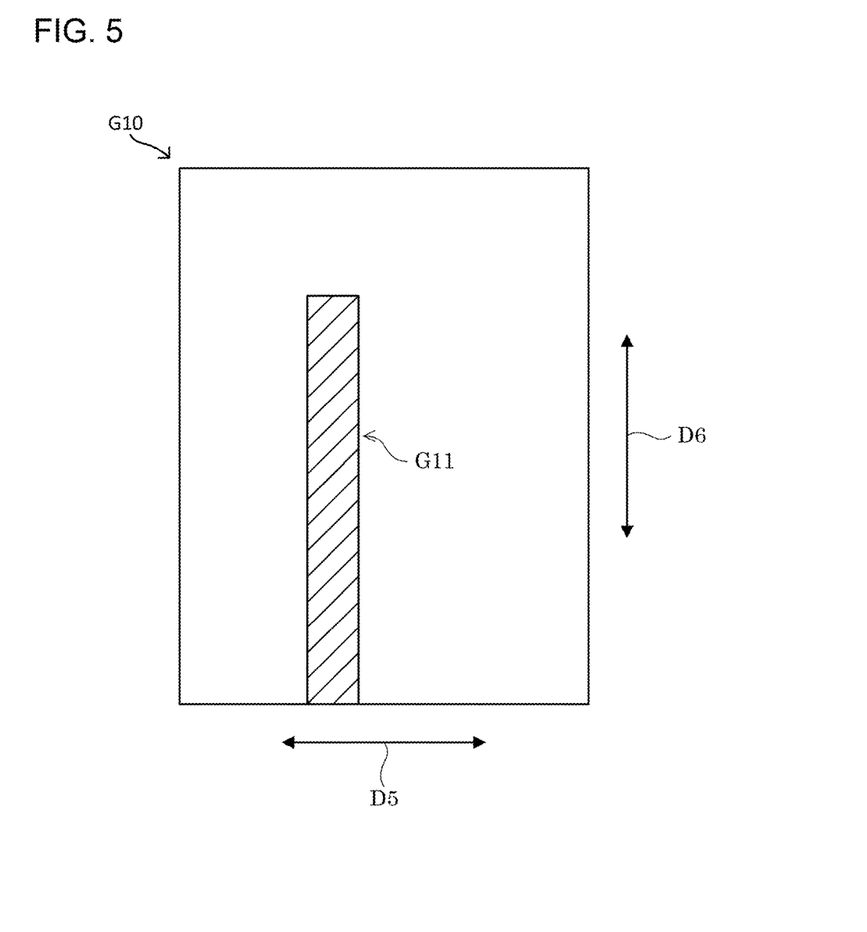
FIG. 5 is a diagram showing an example of image data read from a document sheet by the image forming apparatus according to the embodiment of the present disclosure.

First, a configuration of an image forming apparatus 10 according to an embodiment of the present disclosure is described with reference to FIG. 1 to FIG. 5. Here, FIG. 1 is a schematic cross-sectional diagram showing the configuration of the image forming apparatus 10. FIG. 3 is a schematic cross-sectional diagram showing configurations of an ADF 1 and an image reading portion 2. FIG. 4 is a schematic diagram showing a configuration of an imaging element group 222. FIG. 5 is a diagram showing image data G10 that is an example of image data read from a document sheet by the image reading portion 2.

It is noted that, for the sake of convenience, directions are defined as follows. An up-down direction D1 is defined as the vertical direction in a state where the image forming apparatus 10 is installed usably (the state shown in FIG. 1). A front-rear direction D2 is defined on a basis that the front side of the image forming apparatus 10 on the plane of FIG. 1 is the front side (front surface). Furthermore, a left-right direction D3 is defined based on the front side of the image forming apparatus 10 in the installed state.

The image forming apparatus 10 is a multifunction peripheral having a plurality of functions such as a scan function for reading image data from a document sheet, a print function for forming an image based on image data, a facsimile function, and a copy function.

Figure 2:
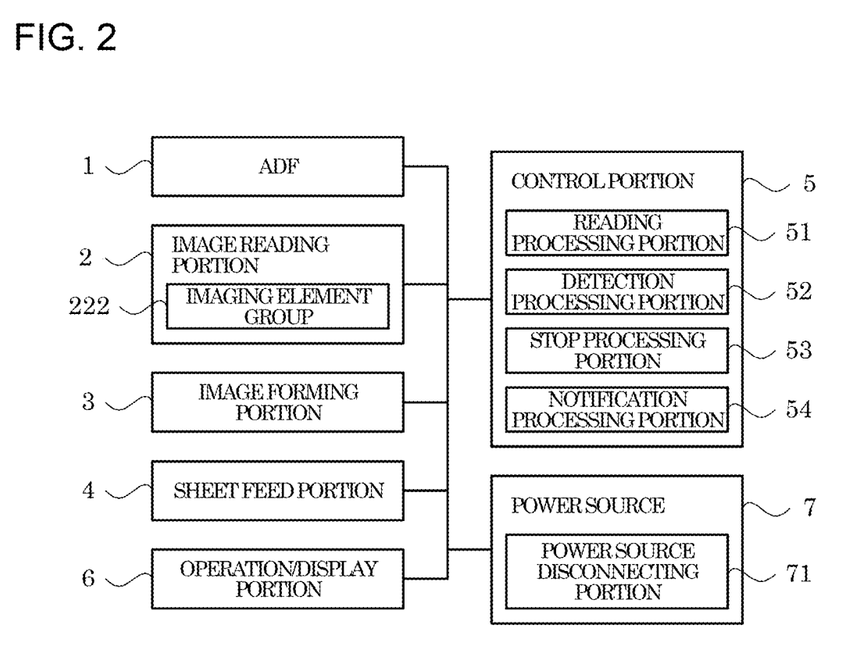
FIG. 2 is a block diagram showing a system configuration of the image forming apparatus according to the embodiment of the present disclosure.

As shown in FIG. 1 and FIG. 2, the image forming apparatus 10 includes the ADF 1 (Auto Document Feeder), the image reading portion 2, an image forming portion 3, a sheet feed portion 4, a control portion 5, an operation/display portion 6, and a power source 7.

The image forming portion 3 is configured to form an image by an electrophotographic system based on image data. Specifically, the image forming portion 3 includes a photoconductor drum, a charging device, a laser scanning device, a developing device, a transfer device, a cleaning device, a fixing device, and a sheet discharge tray. The sheet feed portion 4 includes a sheet feed cassette, a sheet conveyance path, and a plurality of conveyance rollers, and supplies sheets to the image forming portion 3. The image forming portion 3 forms an image based on image data on a sheet supplied from the sheet feed portion 4. The sheet with the image formed thereon by the image forming portion 3 is discharged to the sheet discharge tray. It is noted that the image forming portion 3 may form an image by another image forming system such as an ink jet system.

The control portion 5 includes control equipment such as CPU, ROM, RAM, and EEPROM that are not shown. The CPU is a processor that executes various calculation processes. The ROM is a nonvolatile storage device in which various information such as control programs for causing the CPU to execute various processes are stored in advance. The RAM is a volatile storage device used as temporary storage memory (working area) for the various processes executed by the CPU. The EEPROM is a nonvolatile storage device. In the control portion 5, the CPU executes the various control programs stored in advance in the ROM. This allows the image forming apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image forming apparatus 10.

The operation/display portion 6 includes a display portion and an operation portion, wherein the display portion includes a liquid crystal display and displays various types of information in response to control instructions from the control portion 5, and the operation portion is, for example, operation keys or a touch panel that inputs various types of information to the control portion 5 in response to user operations.

The ADF 1 sequentially conveys a plurality of document sheets placed on a document sheet placement portion 11. Specifically, as shown in FIG. 1 and FIG. 3, the ADF 1 includes the document sheet placement portion 11, a conveyance path 12, a plurality of conveyance rollers 13, a document sheet guide 14, a color reference member 15, and a sheet discharge portion 16. In addition, the ADF 1 is supported in such a way as to be opened and closed with respect to a document sheet table 21 that is described below, and serves as a document sheet cover for covering a document sheet placed on a contact glass 211 of the document sheet table 21. Here, the ADF 1 is an example of the document sheet conveying portion of the present disclosure.

A plurality of document sheets are placed on the document sheet placement portion 11. Each of the document sheets is conveyed along the conveyance path 12 by the ADF 1. The conveyance path 12 is formed by a pair of guide members 12A and 12B (see FIG. 3). The pair of guide members 12A and 12B are formed from resin. As shown in FIG. 3, the conveyance path 12 includes an opening portion 12C that is opened toward the contact glass 211 of the document sheet table 21. In a state where the ADF 1 is closed with respect to the document sheet table 21, the opening portion 12C is closed by the contact glass 211. In this state, the contact glass 211 forms a part of the conveyance path 12.

The plurality of conveyance rollers 13 are formed in the conveyance path 12. The conveyance rollers 13 are driven by a motor (not shown) and sequentially convey the document sheets placed on the document sheet placement portion 11 in a conveyance direction D4 shown in FIG. 3. The document sheet guide 14 is provided in the housing of the ADF 1 so as to face the opening portion 12C. The document sheet guide 14 guides the document sheet conveyed by the conveyance rollers 13 to a reading position P1 (see FIG. 3) on the contact glass 211 of the document sheet table 21. At the reading position P1, the image reading portion 2 reads image data.

The color reference member 15 is provided on a surface of the document sheet guide 14 that faces the contact glass 211. The color reference member 15 includes an image that is composed of only a predetermined color. For example, the predetermined color is white. In the image forming apparatus 10, a shading correction is performed on the image data read from the document sheets, based on image data read from the color reference member 15. After passing the reading position P1, each document sheet is discharged to the sheet discharge portion 16.

The image reading portion 2 is configured to read image data from each document sheet. Specifically, as shown in FIG. 1 and FIG. 3, the image reading portion 2 includes the document sheet table 21 and a reading unit 22.

The document sheet table 21 is provided on an upper surface of a housing of the image forming apparatus 10. As shown in FIG. 1 and FIG. 3, the document sheet table 21 includes the contact glass 211. Each document sheet is placed on the contact glass 211.

As shown in FIG. 1 and FIG. 3, the reading unit 22 is provided below the contact glass 211. The reading unit 22 is configured to be moved in the left-right direction D3 by a movement mechanism (not shown) that includes a driving portion such as a stepping motor. The reading unit 22 is configured to read image data by the CIS (Contact Image Sensor) system from a document sheet placed on the contact glass 211, or a document sheet conveyed by the ADF 1. Specifically, as shown in FIG. 1 and FIG. 3, the reading unit 22 includes a light source 221 and the imaging element group 222.

The light source 221 is composed of a plurality of white LEDs arranged along the front-rear direction D2. The light source 221 emits white light of one line extending in a main scanning direction D5 (see FIG. 5), toward the contact glass 211. The light emitted from the light source 221 passes through the contact glass 211 and is irradiated on a document sheet placed on the contact glass 211 or on a document sheet conveyed by the ADF 1.

In the image reading portion 2, in a case where image data is read from a document sheet placed on the contact glass 211, the reading unit 22 is moved in the left-right direction D3 by the movement mechanism. This allows the light emitted from the light source 221 and irradiated on the document sheet is scanned in a sub scanning direction D6 (see FIG. 5). In addition, in the image reading portion 2, in a case where image data is read from a document sheet conveyed by the ADF 1, the reading unit 22 is moved by the movement mechanism to a position that faces the opening portion 12C of the conveyance path 12. This allows the light source 221 and the imaging element group 222 to be disposed at the conveyance path 12. In this state, as the document sheet is conveyed by the ADF 1, the light emitted from the light source 221 and irradiated on the document sheet at the reading position P1 is scanned in the sub scanning direction D6. The light emitted from the light source 221 and reflected on the document sheet is irradiated on the imaging element group 222.

As shown in FIG. 4, the imaging element group 222 includes a plurality of imaging elements 222A to 222L that are arranged along the front-rear direction D2. The imaging elements 222A to 222L respectively output analog electric signals based on amounts of received light that was emitted from the light source 221 and reflected on the document sheet. The analog electric signals output from the imaging element group 222 are converted to digital electric signals (image data) by an analog front-end circuit (not shown), and the digital electric signals are input to the control portion 5. In this way, image data is read from each document sheet.

The power source 7 supplies power to components of the image forming apparatus 10 including the imaging element group 222. For example, the power source 7 is an AC-DC converter that converts an AC voltage supplied from an external power source, to a DC voltage. As shown in FIG. 2, the power source 7 includes a power source disconnecting portion 71.

The power source disconnecting portion 71 is provided on a power supply path that connects the power source 7 and the imaging element group 222, and is configured to switch between connection and disconnection of the power supply path based on whether or not a control signal has been input from the control portion 5. The power source disconnecting portion 71 is, for example, an electric circuit that includes a semiconductor switch such as a transistor.

It is noted that the power source 7 may individually switch between supply and nonsupply of power to the imaging element group 222 in response to a control signal input from the control portion 5. In this case, the power source 7 may not include the power source disconnecting portion 71.

Meanwhile, for example, during removal of a document sheet jammed in the conveyance path 12, if a worker touches the imaging element group 222, the static electricity of him/her may flow into the imaging element group 222, and a latch-up may occur between some imaging elements of the imaging element group 222. There is known, as a related technology, an image reading device which prevents such a latch-up by supplying power to the imaging element group 222 only when reading operation of image data is performed. It is noted that when a latch-up occurs between some imaging elements of the imaging element group 222, density of a part of image data corresponding to the imaging elements between which the latch-up occurred, is fixed to a predetermined density, and an abnormal stripe image, such as an image G11 shown in FIG. 5, that extends along the sub scanning direction D6 and is different from an image of the document sheet, appears on the read image data.

Here, in a case where the pair of guide members 12A and 12B forming the conveyance path 12 are made of resin, the pair of guide members 12A and 12B are charged with electricity due to friction caused between the document sheet conveyed along the conveyance path 12 and the pair of guide members 12A and 12B. In addition, the contact glass 211 may be charged with electricity due to friction between the conveyed document sheet and the contact glass 211. Here, in the image forming apparatus 10, when a reading process is executed to read image data from document sheets sequentially conveyed by the ADF 1, electric charges that have been collected in the pair of guide members 12A and 12B or the contact glass 211 due to friction with the document sheets may flow into the imaging element group 222, and a latch-up may occur between some imaging elements of the imaging element group 222 during the execution of the reading process. However, according to the configuration of the related technology, even after a latch-up occurs between some imaging elements of the imaging element group 222, the reading process continues to be executed, and reading of image data that includes the abnormal image is continued.

On the other hand, in the image forming apparatus 10 according to the embodiment of the present disclosure, as described in the following, it is possible to prevent reading of image data that includes the abnormal image, from being continued.

Specifically, a reading control program is stored in the ROM of the control portion 5 in advance, wherein the reading control program causes the CPU to execute a reading control process (see the flowchart of FIG. 6) that is described below. It is noted that the reading control program may be recorded on a computer-readable recording medium such as a CD, a DVD, or a flash memory, and read from the recording medium and installed into, for example, the EEPROM of the control portion 5.

As shown in FIG. 2, the control portion 5 includes a reading processing portion 51, a detection processing portion 52, a stop processing portion 53, and a notification processing portion 54. Specifically, the control portion 5 executes the reading control program stored in the ROM by using the CPU. This allows the control portion 5 to function as the reading processing portion 51, the detection processing portion 52, the stop processing portion 53, and the notification processing portion 54. Here, a device that includes the ADF 1, the image reading portion 2, and the control portion 5 is an example of the image reading device of the present disclosure. It is noted that the present disclosure is applicable to image reading devices and image forming apparatuses such as a scanner device, a facsimile device, and a copier.

The reading processing portion 51 executes, by using the ADF 1 and the imaging element group 222, the reading process of reading image data from each of the document sheets placed on the document sheet placement portion 11.

Specifically, the reading processing portion 51 drives the movement mechanism to move the reading unit 22 to a position that faces the opening portion 12C of the conveyance path 12. In addition, after the movement of the reading unit 22, the reading processing portion 51 drives the ADF 1 to sequentially convey the document sheets placed on the document sheet placement portion 11. The reading processing portion 51 then drives the light source 221 and the imaging element group 222 to read image data from each document sheet as it passes the reading position P1.

The detection processing portion 52 detects the abnormal stripe image from image data of a document sheet read in the reading process, wherein the abnormal stripe image extends along the sub scanning direction D6 and is different from an image of the document sheet.

For example, the detection processing portion 52 detects the abnormal image based on the image data read from a document sheet in the reading process and image data read from the color reference member 15 by the imaging element group 222 after the document sheet conveyed by the ADF 1 passes the reading position P1. Specifically, in a case where a stripe image extending along the sub scanning direction D6 is detected from image data read from a document sheet, and the stripe image is also detected from image data that is read from the color reference member 15 immediately after the document sheet, the detection processing portion 52 determines that the abnormal image is included in the image data of the document sheet.

It is noted that the detection processing portion 52 may detect the abnormal image based on only the image data read from each document sheet in the reading process. For example, in a case where a stripe image extending along the sub scanning direction D6 is detected from image data of a document sheet, and the detected stripe image has a predetermined density and a predetermined width, the detection processing portion 52 may determine that the abnormal image is included in the image data of the document sheet.

When the detection processing portion 52 has detected the abnormal image, the stop processing portion 53 stops the reading process and stops the power supply from the power source 7 to the imaging element group 222. Subsequently, after an elapse of a predetermined wait time, the stop processing portion 53 resumes the power supply from the power source 7 to the imaging element group 222, and resumes the reading process. Here, the elapse of the wait time is required to eliminate the latch-up that has occurred between some imaging elements of the imaging element group 222.

Specifically, when a width of the abnormal image in the main scanning direction D5 exceeds a predetermined threshold, the stop processing portion 53 stops the power supply from the power source 7 to the imaging element group 222. On the other hand, when the width of the abnormal image in the main scanning direction D5 is equal to or less than the threshold, the stop processing portion 53 continues the power supply from the power source 7 to the imaging element group 222.

Here, the threshold is a value that is used to determine whether the abnormal image was caused by a latch-up that had occurred between some imaging elements of the imaging element group 222, or by a foreign matter such as paper powder that adhered to the reading position P1. For example, the threshold is set based on an assumed minimum value of the width of the abnormal image in the main scanning direction D5 that is caused by the latch-up, and an assumed maximum value of the width of the abnormal image in the main scanning direction D5 that is caused by the foreign matter. For example, the threshold is set to an intermediate value of the minimum value and the maximum value.

The stop processing portion 53 resumes the reading process in response to a user operation that is received after an elapse of the wait time.

It is noted that, in a case where the abnormal image has been detected by the detection processing portion 52, the stop processing portion 53 may stop the reading process and continue the power supply from the power source 7 to the imaging element group 222. In addition, in a case where the abnormal image has been detected by the detection processing portion 52, the stop processing portion 53 may stop the power supply from the power source 7 to the imaging element group 222 regardless of the width of the abnormal image in the main scanning direction D5. Furthermore, the stop processing portion 53 may automatically resume the reading process after the wait time elapses.

In a case where the abnormal image has been detected by the detection processing portion 52, the notification processing portion 54 notifies that the reading position P1 needs to be cleaned.

Specifically, in a case where the width of the abnormal image in the main scanning direction D5 is equal to or less than the threshold, the notification processing portion 54 notifies that the reading position P1 needs to be cleaned. On the other hand, in a case where the width of the abnormal image in the main scanning direction D5 exceeds the threshold, the notification processing portion 54 does not notify that the reading position P1 needs to be cleaned.

It is noted that, in a case where the abnormal image has been detected by the detection processing portion 52, the notification processing portion 54 may notify that the reading position P1 needs to be cleaned regardless of the width of the abnormal image in the main scanning direction D5.

[Reading Control Process]

Figure 6:
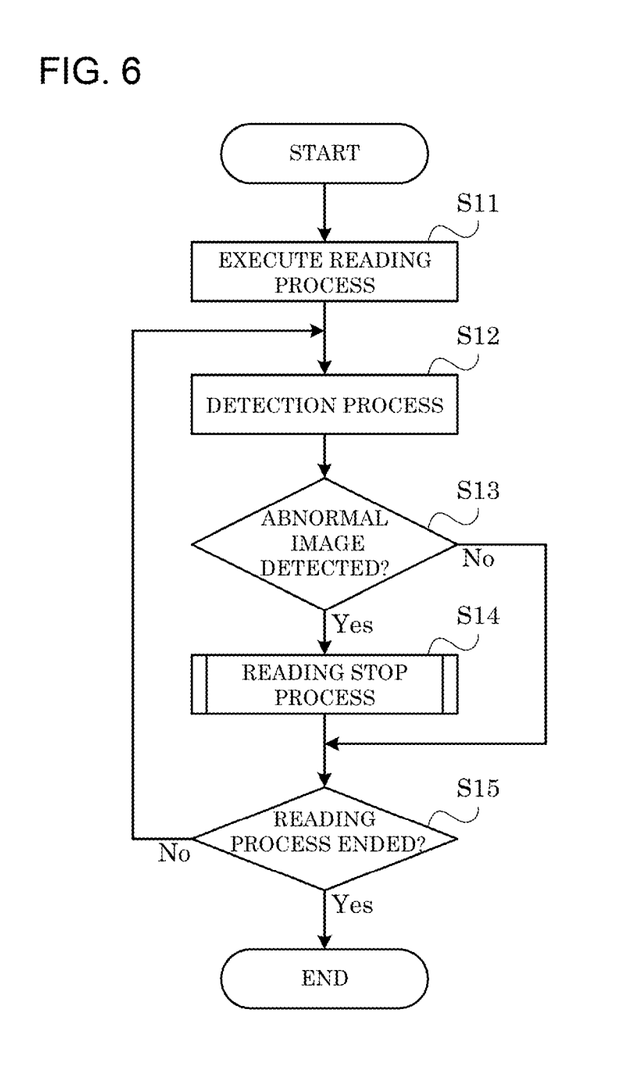
FIG. 6 is a flowchart showing an example of a reading control process executed by the image forming apparatus according to the embodiment of the present disclosure.

In the following, with reference to FIG. 6, a description is given of an example of the procedure of the reading control process executed by the control portion 5 in the image forming apparatus 10, and the image reading method according to the present disclosure. Here, steps S11, S12, . . . represent numbers assigned to the processing procedures (steps) executed by the control portion 5. It is noted that the reading control process is executed in response to a user operation performed on the operation/display portion 6 to instruct to read image data from document sheets in a state where the document sheets are placed on the document sheet placement portion 11 of the ADF 1. For example, the control portion 5 determines whether or not document sheets are present on the document sheet placement portion 11, by using a sensor (not shown) provided on the document sheet placement portion 11.

<Step S11>

First, in step S11, the control portion 5 executes the reading process. Here, the process of step S11 is an example of the reading step of the present disclosure, and is executed by the reading processing portion 51 of the control portion 5.

Specifically, in step S11, the control portion 5 drives the movement mechanism to move the reading unit 22 to a position that faces the opening portion 12C of the conveyance path 12. In addition, after the movement of the reading unit 22, the control portion 5 drives the ADF 1 to sequentially convey document sheets placed on the document sheet placement portion 11. The control portion 5 then drives the light source 221 and the imaging element group 222 to read image data from each document sheet as it passes the reading position P1.

<Step S12>

In step S12, the control portion 5 executes a detection process in which to detect the abnormal image from image data read from the document sheet in the reading process. Here, the process of step S12 is an example of the detection step of the present disclosure, and is executed by the detection processing portion 52 of the control portion 5.

For example, the control portion 5 detects the abnormal image based on the image data read from the document sheet in the reading process and image data read from the color reference member 15 by the imaging element group 222 after the document sheet conveyed by the ADF 1 passes the reading position P1. Specifically, in a case where a stripe image extending along the sub scanning direction D6 is detected from the image data read from a document sheet, and the stripe image is also detected from the image data that is read from the color reference member 15 immediately after the document sheet, the control portion 5 determines that the abnormal image is included in the image data of the document sheet. This makes it possible to prevent a stripe image extending along the sub scanning direction D6 and included in the image data of the document sheet, from being erroneously determined as the abnormal image.

<Step S13>

In step S13, the control portion 5 determines whether or not the abnormal image has been detected in step S12.

Here, upon determining that the abnormal image has been detected in step S12 (Yes side at S13), the control portion 5 moves the process to step S14. In addition, upon determining that an abnormal image has not been detected in step S12 (No side at S13), the control portion 5 moves the process to step S15.

<Step S14>

In step S14, the control portion 5 executes a reading stop process that is described below.

It is noted that in step S14, the control portion 5 may stop the reading process and end the reading control process. In this case, the control portion 5 may display, on the operation/display portion 6, a message that urges the user to turn off and then turn on the main power source again.

<Step S15>

In step S15, the control portion 5 determines whether or not the reading process has ended. For example, when the sensor provided on the document sheet placement portion 11 has detected that no document sheet is placed on the document sheet placement portion 11, the control portion 5 determines that the reading process has ended.

Here, upon determining that the reading process has ended (Yes side at S15), the control portion 5 ends the reading control process. In addition, upon determining that the reading process has not ended (No side at S15), the control portion 5 moves the process to step S12. With this configuration, each time image data is read from a document sheet in the reading process, the processes of steps S12 and S13 are executed and it is determined whether or not the abnormal image is present.

[Reading Stop Process]

Figure 7:
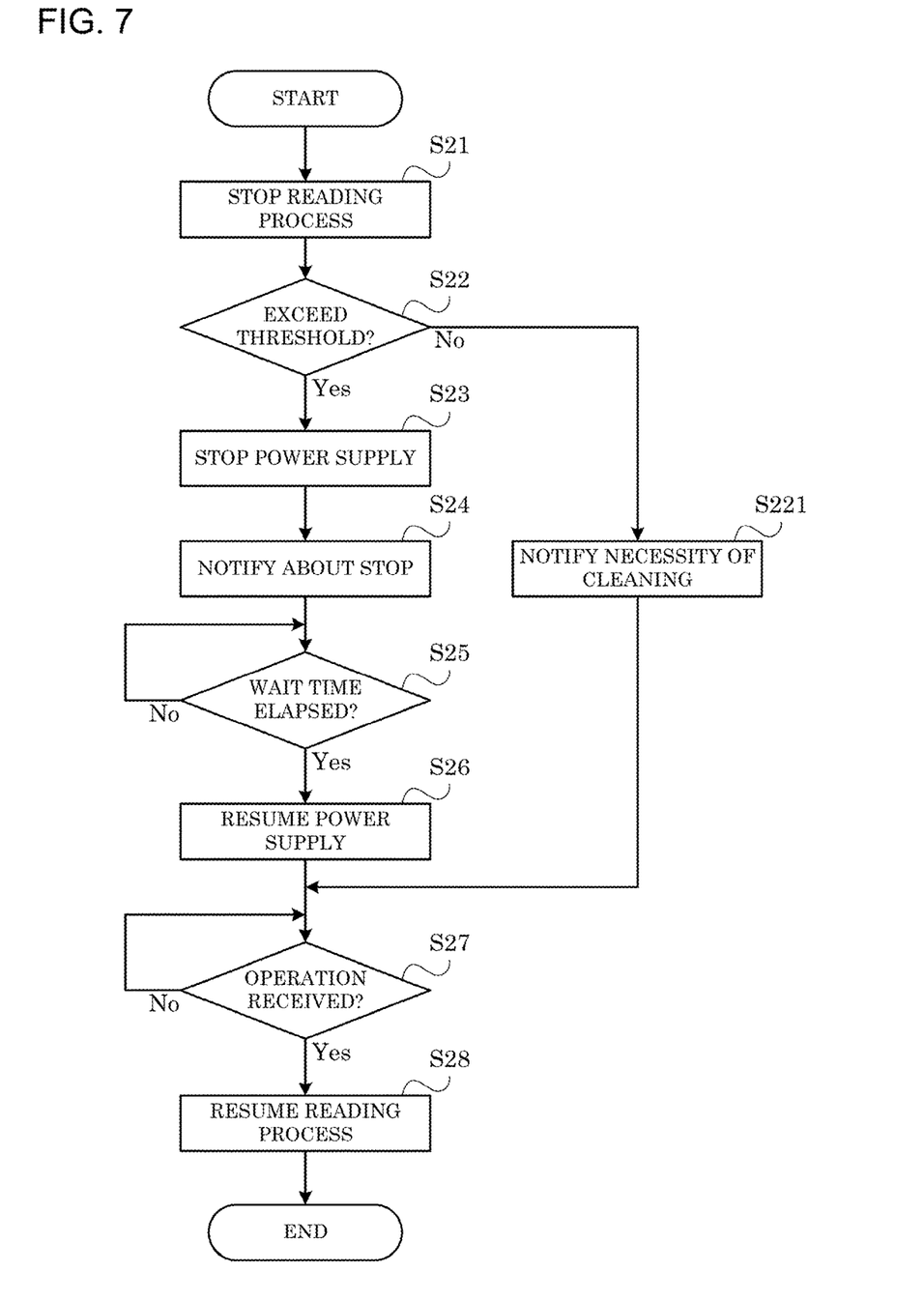
FIG. 7 is a flowchart showing an example of a reading stop process executed by the image forming apparatus according to the embodiment of the present disclosure.

Next, with reference to FIG. 7, a description is given of the reading stop process executed in step S14 of the reading control process.

<Step S21>

First, in step S21, the control portion 5 stops the reading process.

<Step S22>

In step S22, the control portion 5 determines whether or not the width of the abnormal image in the main scanning direction D5 detected in step S12 of the reading control process exceeds the threshold.

Here, upon determining that the width of the abnormal image in the main scanning direction D5 exceeds the threshold (Yes side at S22), the control portion 5 moves the process to step S23. In addition, upon determining that the width of the abnormal image in the main scanning direction D5 is equal to or less than the threshold (No side at S22), the control portion 5 moves the process to step S221.

<Step S221>

In step S221, the control portion 5 notifies that the reading position P1 needs to be cleaned. Here, the process of step S221 is executed by the notification processing portion 54 of the control portion 5.

For example, the control portion 5 displays, on the operation/display portion 6, a message that the reading position P1 needs to be cleaned. With this configuration, the cause of the abnormal image is removed even in a case where the abnormal image has been caused by a foreign matter that adhered to the reading position P1, not by a latch-up that occurred between some imaging elements of the imaging element group 222. It is noted that the processes of steps S22 and S221 may be omitted.

<Step S23>

In step S23, the control portion 5 stops the power supply from the power source 7 to the imaging element group 222.

Specifically, the control portion 5 disconnects the power supply path that connects the power source 7 and the imaging element group 222, by inputting a control signal to the power source disconnecting portion 71.

<Step S24>

In step S24, the control portion 5 notifies that the reading process is stopped until the wait time elapses due to an abnormality that occurred in the imaging element group 222.

For example, the control portion 5 displays, on the operation/display portion 6, a message that the reading process is stopped until the wait time elapses due to an abnormality that occurred in the imaging element group 222. It is noted that the process of step S24 may be omitted. In addition, the process of step S221 may be executed in stead of the process of step S24, and the process of step S22 may be omitted.

<Step S25>

In step S25, the control portion 5 determines whether or not the wait time has elapsed since the power supply from the power source 7 to the imaging element group 222 was stopped in step S23.

Here, upon determining that the wait time has elapsed (Yes side at step S25), the control portion 5 moves the process to step S26. In addition, upon determining that the wait time has not elapsed (No side at step S25), the control portion 5 waits at step S26 for the wait time to elapse. With the elapse of the wait time, the latch-up that occurred between some imaging elements of the imaging element group 222 is eliminated.

<Step S26>

In step S26, the control portion 5 resumes the power supply from the power source 7 to the imaging element group 222 that was stopped in step S23.

Specifically, the control portion 5 makes the power supply path conductive by stopping input of the control signal to the power source disconnecting portion 71. This makes it possible to resume the reading process in a state where the latch-up that occurred between some imaging elements of the imaging element group 222 is eliminated.

<Step S27>

In step S27, the control portion 5 determines whether or not a user operation instructing to resume the reading process has been received.

Here, upon determining that a user operation instructing to resume the reading process has been received (Yes side at S27), the control portion 5 moves the process to step S28. In addition, upon determining that a user operation instructing to resume the reading process has not been received (No side at S27), the control portion 5 waits, at step S27, for a user operation instructing to resume the reading process to be received.

With the above-described configuration, it is possible to prevent the reading process from being resumed before a document sheet that had been read immediately before the reading process was stopped, is returned to the document sheet placement portion 11. This makes it possible to prevent reading of a plurality of document sheets placed on the document sheet placement portion 11 from being disordered. It is noted that the process of step S27 may be omitted.

<Step S28>

In step S28, the control portion 5 resumes the reading process that was stopped in step S21. Here, the processes of steps S21 to S28 are an example of the stop step of the present disclosure, and are executed by the stop processing portion 53 of the control portion 5.

As described above, in the image forming apparatus 10, in a case where the abnormal image is detected from image data read from a document sheet in the reading process, the reading process is stopped. With this configuration, it is possible to prevent reading of image data that includes the abnormal image, from being continued.

In addition, in the image forming apparatus 10, in a case where the abnormal image is detected from image data read from a document sheet in the reading process, the reading process is stopped and the power supply from the power source 7 to the imaging element group 222 is stopped. Subsequently, after an elapse of the wait time, the power supply from the power source 7 to the imaging element group 222 is resumed and the reading process is resumed. This eliminates the time and effort of the user that, when a latch-up occurs between some imaging elements of the imaging element group 222, would be wasted on operating the main power source of the image forming apparatus 10 to eliminate the latch-up. In addition, this eliminates the time and effort of the user wasted on performing an operation to execute the reading process again.

It is noted that the present disclosure is applicable to a configuration where the imaging element group 222 is provided in the conveyance path 12 in a fixed manner.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
a document sheet conveying portion configured to sequentially convey a plurality of document sheets placed on a document sheet placement portion;
an imaging element disposed at a conveyance path along which the document sheets are sequentially conveyed by the document sheet conveying portion;
a power source configured to supply power to the imaging element;
a reading processing portion configured to execute, by using the document sheet conveying portion and the imaging element, a reading process of reading image data from each of the document sheets placed on the document sheet placement portion;
a detection processing portion configured to detect an abnormal stripe image from image data of a document sheet read in the reading process, the abnormal stripe image extending along a sub scanning direction and being different from an image of the document sheet;
a stop processing portion configured to, when the detection processing portion has detected the abnormal stripe image, stop the reading process and a power supply from the power source to the imaging element, resume the power supply from the power source to the imaging element after an elapse of a predetermined wait time, and resume the reading process in response to a user operation that is received after the elapse of the predetermined wait time; and
a notification processing portion configured to, in a case where the abnormal stripe image has been detected by the detection processing portion, notify that a reading position at which image data is read by the imaging element needs to be cleaned, wherein
when a width of the abnormal stripe image in a main scanning direction exceeds a predetermined threshold, the stop processing portion stops the power supply from the power source to the imaging element, and
when the width of the abnormal stripe image in the main scanning direction is equal to or less than the threshold, the notification processing portion notifies that the reading position needs to be cleaned.

2. The image reading device according to claim 1, wherein
the detection processing portion detects the abnormal stripe image based on the image data read from the document sheet in the reading process and image data read from a color reference member by the imaging element after the document sheet conveyed by the document sheet conveying portion passes a reading position at which image data is read by the imaging element.

3. An image forming apparatus comprising:
the image reading device according to claim 1; and
an image forming portion configured to form an image based on image data.

4. An image reading method executed in an image reading device that includes a document sheet conveying portion configured to sequentially convey a plurality of document sheets placed on a document sheet placement portion, an imaging element disposed at a conveyance path along which the document sheets are sequentially conveyed by the document sheet conveying portion, and a power source configured to supply power to the imaging element,
the image reading method comprising:
a reading step of executing, by using the document sheet conveying portion and the imaging element, a reading process of reading image data from each of the document sheets placed on the document sheet placement portion;

a detection step of detecting an abnormal stripe image from image data of a document sheet read in the reading process, the abnormal stripe image extending along a sub scanning direction and being different from an image of the document sheet;

a stop step of, when the detection step has detected the abnormal stripe image, stopping the reading process and a power supply from the power source to the imaging element, resuming the power supply from the power source to the imaging element after an elapse of a predetermined wait time, and resuming the reading process in response to a user operation that is received after the elapse of the predetermined wait time; and a notification step of, in a case where the abnormal stripe image has been detected in the detection step, notifying that a reading position at which image data is read by the imaging element needs to be cleaned, wherein when a width of the abnormal stripe image in a main scanning direction exceeds a predetermined threshold, the stop step stops power supply from the power source to the imaging element, and when the width of the abnormal stripe image in the main scanning direction is equal to or less than the threshold, the notification step notifies that the reading position needs to be cleaned.

5. An image reading device comprising:
a document sheet conveying portion configured to sequentially convey a plurality of document sheets placed on a document sheet placement portion;
an imaging element disposed at a conveyance path along which the document sheets are sequentially conveyed by the document sheet conveying portion;
a power source configured to supply power to the imaging element;
a reading processing portion configured to execute, by using the document sheet conveying portion and the imaging element, a reading process of reading image data from each of the document sheets placed on the document sheet placement portion;
a detection processing portion configured to detect an abnormal stripe image from image data of a document sheet read in the reading process, the abnormal stripe image extending along a sub scanning direction and being different from an image of the document sheet; and
a stop processing portion configured to, when the detection processing portion has detected the abnormal stripe image, stop the reading process and a power supply from the power source to the imaging element, and after an elapse of a predetermined wait time, resume the power supply from the power source to the imaging element, and resume the reading process, wherein
the detection processing portion detects the abnormal stripe image based on the image data read from the document sheet in the reading process and image data read from a color reference member by the imaging element after the document sheet conveyed by the document sheet conveying portion passes a reading position at which image data is read by the imaging element.

6. The image reading device according to claim 5, wherein
the stop processing portion resumes the reading process in response to a user operation that is received after an elapse of the predetermined wait time.

7. The image reading device according to claim 6, further comprising:
a notification processing portion configured to, in a case where the abnormal stripe image has been detected by the detection processing portion, notify that a reading position at which image data is read by the imaging element needs to be cleaned.

8. An image forming apparatus comprising:
the image reading device according to claim 5; and
an image forming portion configured to form an image based on image data.

9. An image reading method executed in an image reading device that includes a document sheet conveying portion configured to sequentially convey a plurality of document sheets placed on a document sheet placement portion, an imaging element disposed at a conveyance path along which the document sheets are sequentially conveyed by the document sheet conveying portion, and a power source configured to supply power to the imaging element,
the image reading method comprising:
a reading step of executing, by using the document sheet conveying portion and the imaging element, a reading process of reading image data from each of the document sheets placed on the document sheet placement portion;
a detection step of detecting an abnormal stripe image from image data of a document sheet read in the reading process, the abnormal stripe image extending along a sub scanning direction and being different from an image of the document sheet; and
a stop step of, when the detection step has detected the abnormal stripe image, stopping the reading process and a power supply from the power source to the imaging element, and after an elapse of a predetermined wait time, resuming the power supply from the power source to the imaging element, and resuming the reading process, wherein
the detection step detects the abnormal stripe image based on the image data read from the document sheet in the reading process and image data read from a color reference member by the imaging element after the document sheet conveyed by the document sheet conveying portion passes a reading position at which image data is read by the imaging element.

\* \* \* \* \*